United States Patent [19]

Book et al.

[11] Patent Number: 5,721,406

[45] Date of Patent: Feb. 24, 1998

[54] ARC-RESISTANT ENCLOSURE EMPLOYING ARC-QUENCHING CONTACT DISCONNECT AND METHOD FOR AVOIDING ARCING IN THE ENCLOSURE

[75] Inventors: William J. Book, Lake Mary, Fla.; Leo E. Blom, Murfreesboro, Tenn.

[73] Assignee: ABB Power T&D Company Inc., Raleigh, N.C.

[21] Appl. No.: 609,464

[22] Filed: Mar. 1, 1996

[51] Int. Cl.⁶ .............. H01H 9/20; H02B 11/00; H01R 13/53

[52] U.S. Cl. .............. 200/50.24; 361/606; 439/187

[58] Field of Search .............. 200/50.21, 50.22, 200/50.24, 50.26, 50.27; 439/181–187; 361/605–621

[56] References Cited

U.S. PATENT DOCUMENTS

| | | | |
|---|---|---|---|
| 2,777,024 | 1/1957 | West | 200/50 |
| 3,223,890 | 12/1965 | Maul et al. | 317/15 |
| 3,628,092 | 12/1971 | Keto | 317/15 |
| 3,784,764 | 1/1974 | Wilson | 200/50 AA |
| 3,792,215 | 2/1974 | Keto | 200/144 |
| 3,894,204 | 7/1975 | May et al. | 200/50 |
| 4,860,161 | 8/1989 | Maki et al. | 361/338 |
| 4,926,286 | 5/1990 | Maki et al. | 361/345 |
| 5,266,041 | 11/1993 | DeLuca | 439/184 |

*Primary Examiner*—Peter S. Wong
*Assistant Examiner*—Bao Q. Vu
*Attorney, Agent, or Firm*—Woodcock Washburn Kurtz Mackiewicz & Norris LLP

[57] ABSTRACT

A switchgear enclosure which permits closed door operation during the opening and closing of the primary contacts of electrical apparatus housed in the enclosure with the use of an arc-suppressor-type contact.

7 Claims, 3 Drawing Sheets

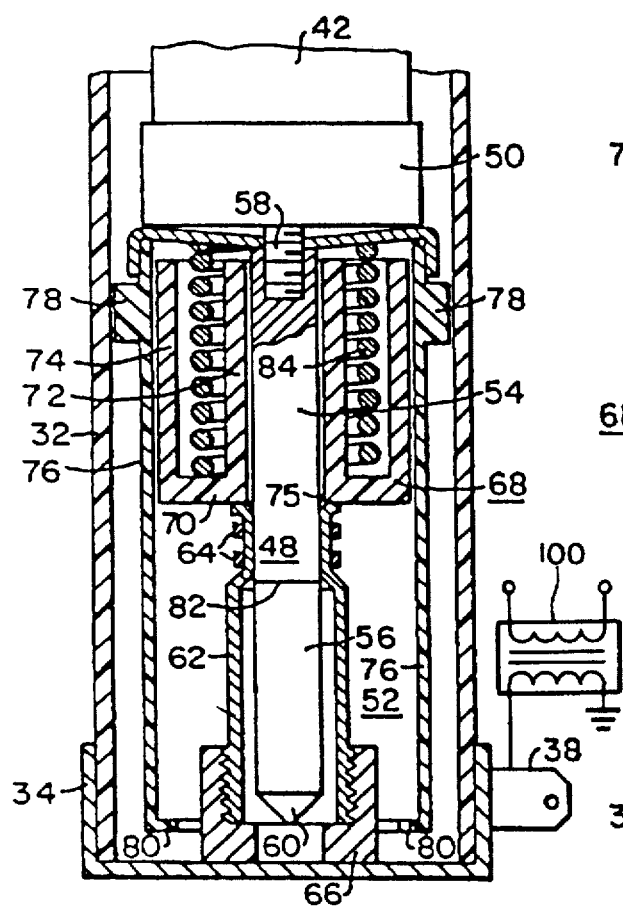
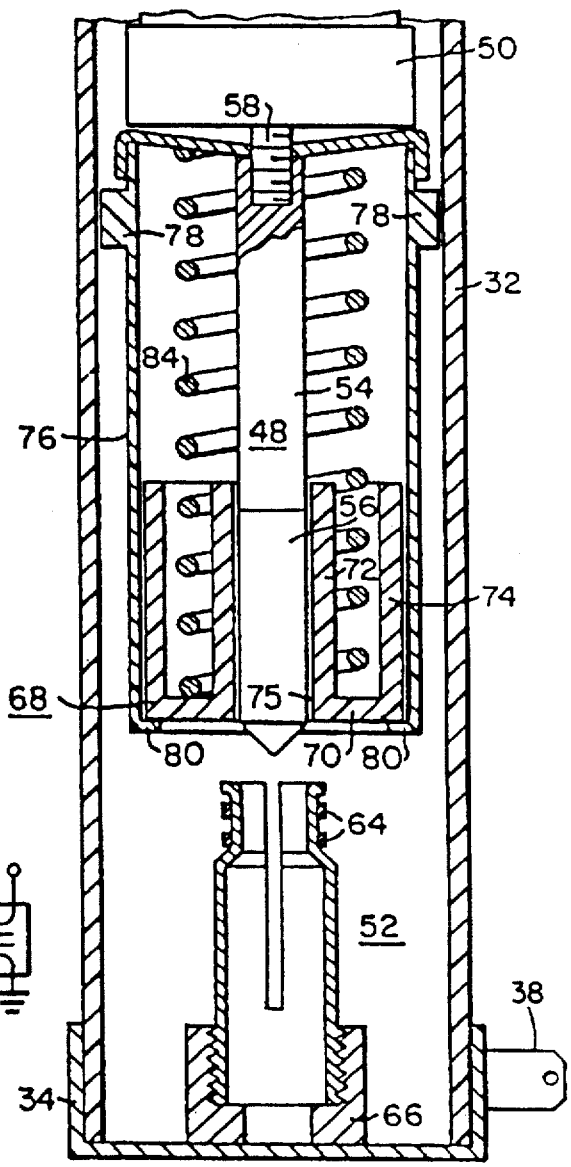
PRIOR ART
Fig. 1A
PRIOR ART
Fig. 1B

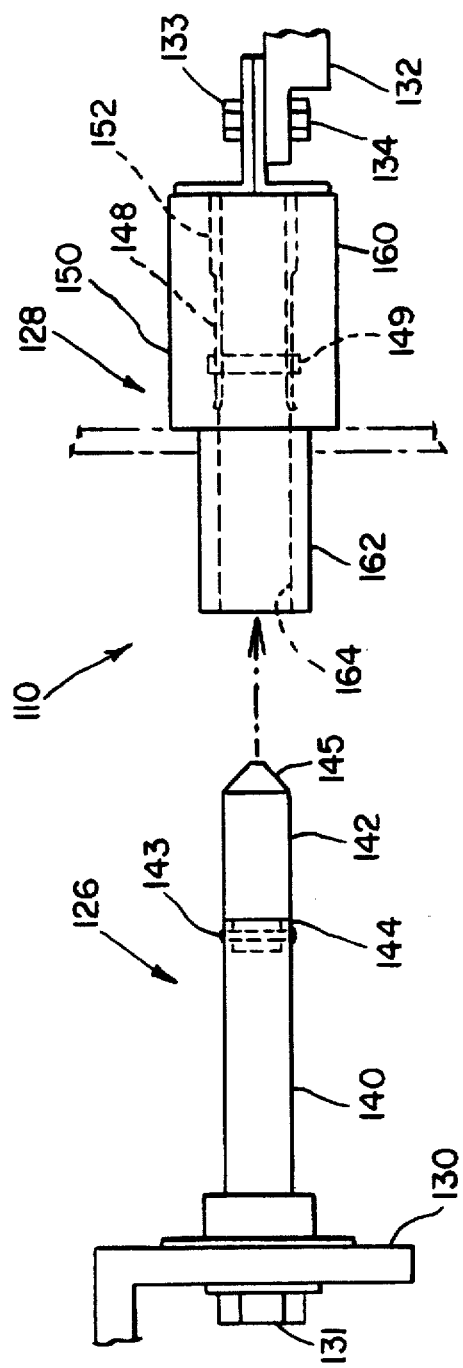
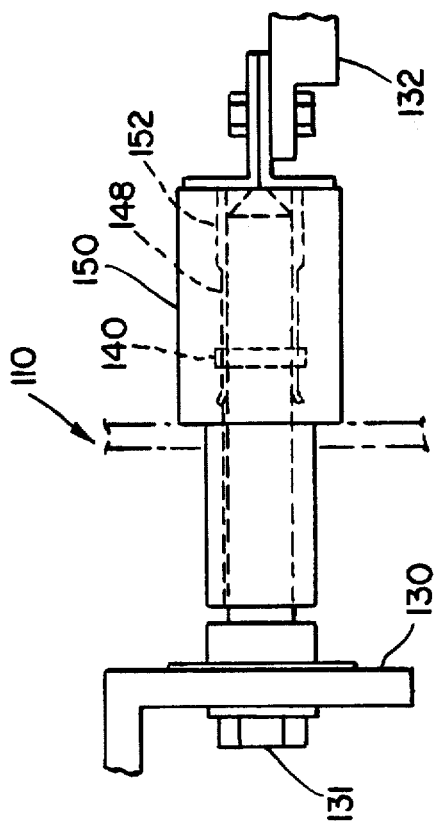
Fig. 2C
Fig. 2B

ARC-RESISTANT ENCLOSURE EMPLOYING ARC-QUENCHING CONTACT DISCONNECT AND METHOD FOR AVOIDING ARCING IN THE ENCLOSURE

FIELD OF THE INVENTION

The present invention relates generally to electrical power distribution equipment, such as medium voltage switchgear, and more particularly to an arc-resistant enclosure for housing an electrical apparatus employing an arc-quenching contact disconnect and to a method for avoiding arcing in the enclosure.

BACKGROUND OF THE INVENTION

I. Switchgear Enclosures

This invention relates to a novel use of an arc-quenching contact disconnect in an arc-resistant auxiliary compartment of an arc-resistant enclosure for switchgear (e.g., medium voltage switchgear). In ANSI rated switchgear, the high-voltage circuit or bus must be isolated from the operator, but the operator must be provided with access to the auxiliary equipment (e.g., transformers, fuses, etc.). Typically, the equipment is installed on a mobile platform such as a movable tray, drawer or trunnion, and is connected and disconnected by hand.

A closed door, mechanically racked contact that is connected and disconnected by some mechanical means is desirable in arc-resistant switchgear. To maintain the integrity of the compartment, closed door operation is essential. If the contact cannot be quickly broken, a condition conducive to arcing may be created.

U.S. Pat. No. 2,777,024 is an example of a prior art switchgear enclosure having circuit breakers of the horizontal drawout-type disposed therein. Such prior art enclosures utilize a secondary device to break the current path before the primary contact members are separated in order to avoid arcing at the primary contacts.

SUMMARY OF THE INVENTION

I. Objects of the Invention

Accordingly, an object of the present invention is to provide a method and apparatus for safely avoiding the creation of a condition conducive to uncontrolled arcing. A more specific object of the present invention is to provide a cost effective and reliable method and apparatus for safely avoiding uncontrolled arcing in an enclosure such as an auxiliary compartment of an arc-resistant switchgear enclosure without the use of a secondary device to break the current path before the primary contact members are separated.

II. Summary of Benefits and Distinguishing Features of the Invention

The present invention achieves the above-stated goals by employing means such as a mechanical racking mechanism for moving an electrical apparatus in an enclosure housing the electrical apparatus, with the door to the housing being in a closed position, in combination with an arc-suppression-type contact to accommodate the relative slow speed of the racking operation. Presently preferred embodiments of the invention use this type of arc-suppression contact in connection with auxiliary equipment housed in an arc-resistant switchgear enclosure.

III. Summary of Claims

The present invention provides a novel arc-resistant enclosure for housing an electrical apparatus or equipment. A presently preferred embodiment of the invention includes a door movable between open and closed positions for opening and closing an entry of the enclosure; means for moving the electrical apparatus from a fully inserted, electrically connected position in the enclosure to an electrically disconnected position in the enclosure when said door is in a closed position; and a bus for providing electrical energy to the electrical equipment when the equipment is in the fully inserted, electrically connected position. The electrical apparatus is mounted on the means for moving the electrical apparatus so as to be movable into and out of the enclosure through the entry. In accordance with the invention, an arc-suppression contact comprising a probe contact member and a bushing contact member is employed to electrically connect the electrical apparatus or equipment to the bus. In one embodiment, the probe contact member is electrically connected and mechanically attached to the electrical apparatus so as to be movable with the apparatus, and the bushing contact member is electrically connected to the bus and held in a fixed position within the arc-resistant enclosure. In an alternative embodiment (not shown in the drawings), the positions of the probe contact member and bushing contact member are interchanged.

In accordance with another aspect of the invention, a method is set forth for connecting and disconnecting an energized circuit of electrical apparatus and avoiding the arcing in the enclosure housing the electrical apparatus. Other features of the invention are described below.

BRIEF DESCRIPTION OF THE DRAWINGS

FIG. 1A is a partial elevational view illustrating a lower portion of the load-break device disclosed in U.S. Pat. No. 3,792,215.

FIG. 1B is a partial elevational view of the load-break device shown in FIG. 1A in a disengaged position.

FIG. 2B is an enlarged view of the arc-quenching contact disconnect shown in FIG. 2A, with the contact disconnect in a load make, or engaged, position.

FIG. 2C is a view similar to that of FIG. 2B but showing the arc-quenching contact disconnect in a load break, or disengaged, position.

DETAILED DESCRIPTION OF PREFERRED EMBODIMENTS

I. Prior Art Load-Break Device (Keto)

Figure 2A:
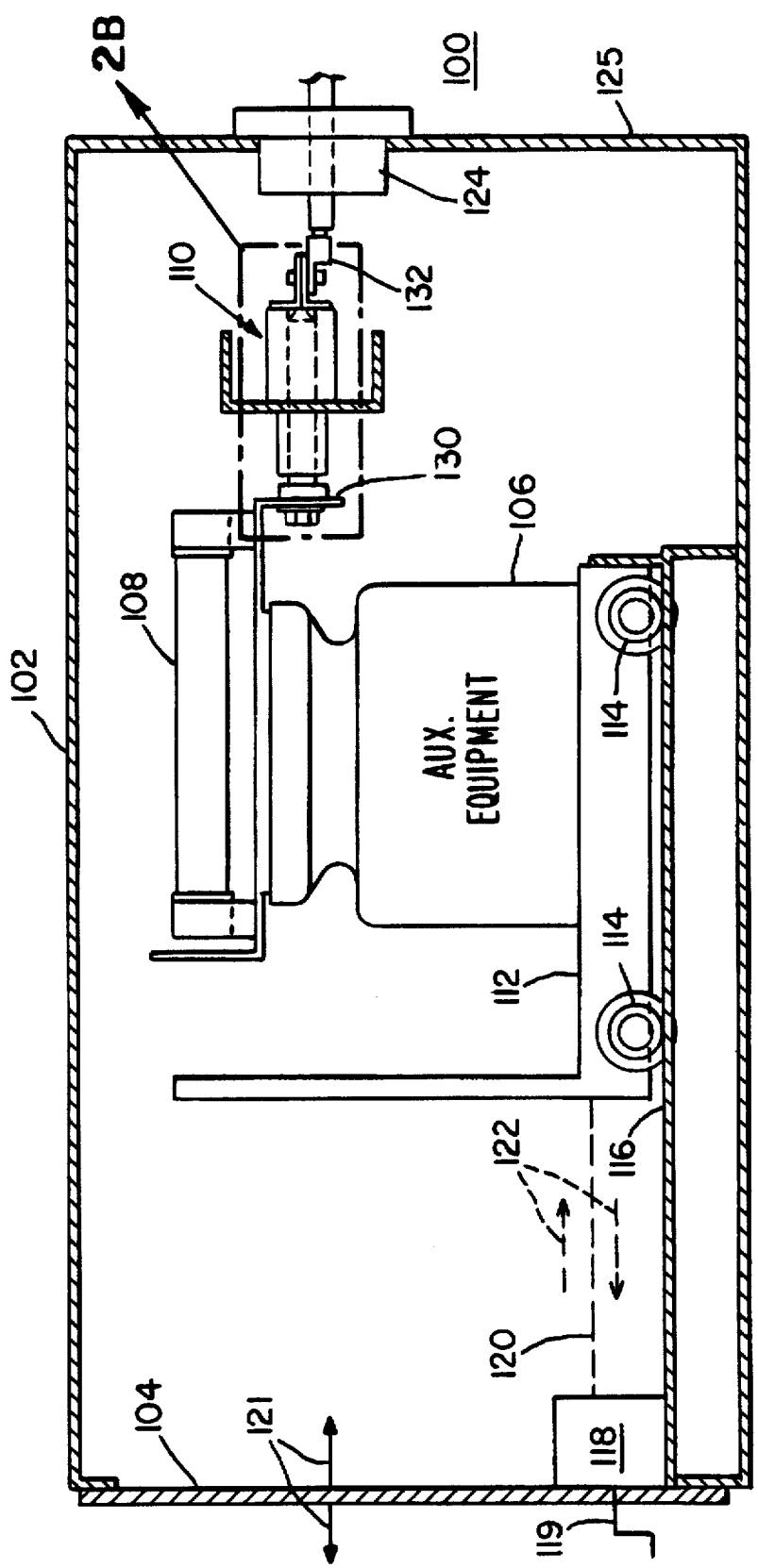
FIG. 2A is a diagrammatic cross-sectional side view of an auxiliary compartment of an arc-resistant switchgear enclosure. The auxiliary compartment employs an arc-quenching contact disconnect in accordance with the present invention.

According to the present invention, the contact disconnect mechanism of the above-described prior art switchgear enclosure is replaced by a modified form of a load-break device of the type disclosed in U.S. Pat. No. 3,792,215, Feb. 12, 1974, titled "Electrical Load-Break Apparatus" (Keto), and depicted in FIGS. 1A and 1B. Referring to FIG. 1A, Keto's load-break device includes a probe 48 attached to a lower end 50 of a current limiting fuse 42. The probe 48 and a probe receiver 52 complete the electrical path between a first terminal lug 38 and a second terminal lug (not shown) electrically connected at an upper end of the fuse 42. Current entering the fuse 42 travels through the lower current limiting fuse end 50, the probe 48, the probe receiver 52, a lower casing contact 34, the circuit terminal lug 38, and then to an electrical circuit, e.g., a transformer circuit 100.

The probe 48 includes an upper portion 54 constructed of an electrically conducting material and attached to the lower end 50 of the fuse 42 by a stud 58. The probe 48 also includes a lower portion 56 constructed of an electrically insulating material and attached to an end 82 of the probe portion 54. The probe 48 includes a lower end 60 that is tapered to facilitate insertion into the probe receiver 52.

The probe receiver 52 includes a finger contact structure 62 having springs 64 positioned to maintain contact pressure between the finger contact structure 62 and the conducting probe portion 54. The finger contact structure 62 is threadably engaged with a boss projection 66 from the lower casing terminal 34.

An arc-quenching sleeve 68 is positioned around the probe 48. The arc-quenching sleeve 68 is constructed of an insulating material and includes a base portion 70 and tubular side portions 72 and 74 extending from the base portion 70. An opening 75 in the base portion 70 permits the penetration of the probe through the arc-quenching sleeve 68 and allows the arc-quenching sleeve 68 to slide along the probe 48. An outer tubular guide member 76 is attached to the lower fuse end 50 and is constructed of an insulating material. Projections 78 on the guide member 76 keep the probe 48 aligned with the probe receiver 52 during insertion of the fuse assembly. The guide member 76 also includes projections 80 which limit the sliding movement of the arc-quenching sleeve 68 along the probe 48. The side portions 72 and 74 guide the arc-quenching sleeve 68 through the space defined by the guide member 76 and the probe 48.

When the removable fuse assembly is withdrawn, the probe receiver 52 and the probe 48 become disengaged. While being disengaged under load, an arc may strike between the conducting portion 54 of the probe 48 and the contact structure 62. The arc strikes as the end 82 of the conducting portion 54 leaves the top of the contact structure 62. As the probe 48 is disengaged from the probe receiver 52, the arc-quenching sleeve slides along the probe 48 and remains seated substantially on the top of the contact structure 62 due to the force from a spring 84. The insulated portion 56 of the probe 48 is drawn through the arc-quenching sleeve 68. To persist, the arc must traverse a path between the insulated portion 56 and the arc-quenching sleeve 68. The dimensions of the probe 48 and the arc-quenching sleeve 68 are selected to provide a relatively tight fit between the arc-quenching sleeve 68 and the probe 48.

FIG. 1B illustrates Keto's load-break device in a disengaged position. When the probe 48 is completely disengaged from the probe receiver 52, the arc-quenching sleeve 68 is positioned substantially between the conducting portion 54 of the probe 48 and the contact structure 62. Therefore, the path therebetween is effectively blocked, thus quenching any arc.

II. Modification of Prior Art Load-Break Device for Use in Switchgear Enclosure

Referring now to FIG. 2A, which diagrammatically depicts an exemplary switchgear apparatus 100, the switchgear apparatus 100 comprises an enclosure 102 having an entry and exit door 104 and a removable circuit device 106, i.e., an electrical apparatus, which in the present example is depicted as Aux. Equipment (Auxiliary Equipment). The Aux. Equipment 106, of course, could be any type of electrical equipment or apparatus and, of course, could be a circuit breaker with or without fuses. As shown, the Aux. Equipment 106 includes fuse member(s) 108 and mating primary contact members shown generally at 110.

The Aux. Equipment 106 is mounted on a low mobile platform 112 such as a movable tray, drawer or trunnion. The platform 112 includes wheels 114 which ride on tracks 116.

A racking mechanism is diagrammatically shown at 118 having a hand crank 119. The racking mechanism 118 includes a mechanical connection, depicted by broken line 120, to platform 112. The racking mechanism 118 facilitates movement of Aux. Equipment 106 via platform 112 over the tracks 116 which guide the platform 112 as the platform 112 moves within enclosure 102 and into and out of the enclosure 102 through the door 104, which, in turn, is movable between open and closed positions as depicted by the arrows 121. The arrows 122 indicate movement of the platform 112 within the enclosure 102 and also indicate movement of the platform 112 into and out of the enclosure 102 via operation of the racking mechanism 118 through hand crank 119.

The mating primary contact members 110 are connected to an electrical bus 124 which provides electrical energy to the Aux. Equipment 106 when the Aux. Equipment 106 is fully inserted into the enclosure 102, i.e., the position shown in FIG. 2A. The bus 124 is fixedly mounted on the rear wall 125 of the enclosure 102.

Referring now to FIGS. 2B and 2C, a preferred embodiment of the arc-suppression primary contact members 110 of the present invention is shown. According to the preferred embodiment, the arc-suppression contact members 110 comprise probe contact member 126 and bushing contact member 128. The probe contact member 126 is electrically connected and mechanically attached to Aux. Equipment 106 through terminal 130 via bolt 131 and therefore is movable with the Aux. Equipment 106.

The bushing contact member 128 is electrically connected to bus 120 through terminal lug 132 via nut 133 and bolt 134 and is thereby held in a fixed position within the enclosure 102.

The probe contact member 126 includes a portion 140 which is constructed of an electrically conducting material which is attached to the terminal 130. The probe contact member 126 also includes a portion 142 which is constructed of a suitable electrically insulating material having arc extinguishing characteristics and which is attached via pin 143 to the end 144 of the probe portion 140. As disclosed in U.S. Pat. No. 3,628,092, there are many different insulating materials which possess arc extinguishing characteristics, as opposed to arc tracking characteristics, with the arc extinguishing materials producing gases when being subjected to the heat of an arc, which gases expand to blast, cool and deionize the arc. Suitable insulating material for the probe portion 142 would be methyl methacrylate with a twenty (20) percent glass filler or Delrin, a trademark for a type of acetal resin by DuPont.

The probe 126 is longitudinally shaped, that is having a length dimension substantially greater than its width or depth dimensions. Although other tubular shapes may be used, the probe 126 is normally cylindrically shaped with the end 145 of the probe portion 142 tapered to facilitate insertion into the bushing contact member 128.

The bushing contact member 128 includes a finger contact structure 148, which is constructed of an electrically conducting material such as copper, which has an annular spring member 149 positioned thereon to maintain contact pressure between the finger contact structure 148 and the conducting probe portion 140. The finger contact structure 148 is threadably engaged with the sleeve 150 at the end 152 thereof. The finger contact structure 148 has dimensions which allow the probe portion 126 to readily engage with the finger contact structure 148 when probe portions 142 and 140 are inserted into the contact finger structure 148.

The sleeve portion 150 is also constructed of a suitable insulating or arc-quenching material. The sleeve portion 150 includes a base portion 160 and a tubular portion 162 extending from the base portion 160. An opening 164 in the tubular portion 162 permits the probe 126 to be inserted into the bushing contact member.

Referring again to FIG. 2A, when the platform 112 is moved to the left via operation of the racking mechanism 118, the bushing contact member 128 and the probe contact member 126 become disengaged. While being disengaged under load, an arc usually strikes between the conducting portion 140 of the probe member 126 and the contact structure 148. The arc strikes as the end 144 of the conducting portion 140 leaves the contact structure 148. As the probe 126 is disengaged from the bushing contact member 128, the portion 142 slides along the tubular portion 162 of sleeve portion 150 as it is withdrawn from the sleeve portion 150. Therefore, in order for an arc to persist, it must traverse a path between the portion 142 of the probe contact member 126 and the tubular portion 162 of the sleeve 150.

The dimensions of the probe 126 and the tubular portion 162 of sleeve 150 are selected to provide a relatively tight fit between the sleeve 150 and the probe 126. However, the fit is sufficiently loose to permit satisfactory sliding of the probe 126 along the sleeve 150. In addition to the blocking of the arc path furnished by the arc-quenching sleeve 150, the material of the sleeve contains arc-extinguishing properties which also aid in quenching the arc.

It will be readily understood to those skilled in the art that the above described invention permits closed door operation while at the same time an apparatus and method which, in an energized circuit, accommodates for the relatively slow speed of the racking operation which, without the use of the herein described arc-suppressor-type contact, may draw an arc when the primary contacts are separated.

The above description of presently preferred embodiments is not intended to limit the scope of protection of the following claims. Thus, for example, except where they are expressly so limited, the following claims are not limited to processes or systems employing the particular electrical load break apparatus or arc-quenching contact design described above; nor are the claims limited to any particular configuration of switchgear compartments or type of switchgear equipment. For example, the method and apparatus of the present invention could be used with single or three phase equipment housed in the enclosure. With three phase electrical equipment, three arc-suppression primary contact members 110 would be utilized.

Having thus described our invention,

We claim:

1. An arc-resistant enclosure for housing an electrical apparatus, comprising:
   (a) a door movable between open and closed positions for opening and closing an entry of said enclosure;
   (b) means for moving said electrical apparatus from a fully inserted, electrically connected position in said enclosure to an electrically disconnected position in said enclosure when said door is in a closed position;
   (c) a bus for providing electrical energy to said electrical apparatus when said equipment is in said fully inserted, electrically connected position; and
   (d) an arc-suppression contact comprising a probe contact member and a bushing contact member, said probe contact member being electrically connected and mechanically attached to said electrical apparatus so as to be movable with said apparatus, and said bushing contact member being electrically connected to said bus and held in a fixed position within said enclosure.

2. An arc-resistant enclosure as set forth in claim 1 wherein said means for moving said electrical apparatus comprise racking means.

3. An arc-resistant enclosure as set forth in claim 1 wherein said means for moving said electrical apparatus comprise
   a platform having wheels mounted thereon; and
   racking means operatively connected to said platform for moving said platform, said electrical apparatus being mounted on said platform and being movable therewith.

4. An arc-resistant enclosure as set forth in claim 3 wherein said means for moving said electrical apparatus further comprises
   track means, said track means guiding said platform during movement thereof.

5. An enclosure for housing medium voltage switchgear apparatus, comprising:
   (a) a door movable between open and closed positions for opening and closing an entry of said enclosure;
   (b) means including track means for moving and guiding said apparatus from a fully inserted, electrically connected position in said enclosure to an electrically disconnected position in said enclosure when said door is in a closed position, said apparatus being mounted on said track means so as to be movable into and out of said enclosure through said entry when so desired;
   (c) a bus for providing electrical energy to said apparatus when said apparatus is in said fully inserted, electrically connected position; and
   (d) an arc suppression contact comprising a probe contact member and a bushing contact member, wherein one of said probe and bushing contact members is electrically connected and attached to said apparatus so as to be movable with said apparatus, and the other of said probe and bushing contact members is electrically connected to said bus and held in a fixed position.

6. In an electrical apparatus enclosure comprising a door movable between open and closed positions; means for moving an electrical apparatus from a fully inserted, electrically connected position in said enclosure to an electrically disconnected position in said enclosure when said door is in a closed position, said electrical apparatus being mounted on said means for moving an electrical apparatus so as to be movable into and out of said enclosure through an entry of said enclosure; and a bus for providing electrical energy to said electrical apparatus when said equipment is in said fully inserted, electrically connected position, a method for connecting and disconnecting an energized circuit and avoiding arcing in said enclosure when said equipment is moved from a connected position to a disconnected position, comprising the step of:
   a) providing an arc-suppression contact for electrically connecting said electrical apparatus to said bus, said contact comprising a probe contact member and a bushing contact member, wherein one said probe and contact members is electrically connected and mechanically attached to said electrical apparatus so as to be movable with said apparatus equipment, and the other of said probe and bushing contact members is electrically connected to said bus and held in a fixed position within said enclosure; and,
   b) moving said apparatus to connect or disconnect said arc-suppression contact when said door is in a closed position.

7. A method as set forth in claim 6 wherein said probe contact member is electrically connected and mechanically attached to said electrical apparatus.

* * * * *